US012559917B2

(12) United States Patent
Araki et al.

(10) Patent No.: US 12,559,917 B2
(45) Date of Patent: Feb. 24, 2026

(54) WORKING MACHINE AND POSITION DETECTING DEVICE

(71) Applicants: University of Hyogo, Hyogo (JP); Nabtesco Corporation, Tokyo (JP)

(72) Inventors: Nozomu Araki, Hyogo (JP); Yuki Kurisu, Hyogo (JP); Tomio Shigaki, Tokyo (JP); Ryota Katsumata, Tokyo (JP)

(73) Assignees: UNIVERSITY OF HYOGO, Hyogo (JP); NABTESCO CORPORATION, Tokyo (JP)

( * ) Notice: Subject to any disclaimer, the term of this patent is extended or adjusted under 35 U.S.C. 154(b) by 183 days.

(21) Appl. No.: 18/451,375

(22) Filed: Aug. 17, 2023

(65) Prior Publication Data

US 2024/0117607 A1 Apr. 11, 2024

(30) Foreign Application Priority Data

Oct. 7, 2022 (JP) ................................. 2022-162335

(51) Int. Cl.
G06T 7/73 (2017.01)
E02F 9/26 (2006.01)
G06T 5/80 (2024.01)

(52) U.S. Cl.
CPC ................ E02F 9/265 (2013.01); G06T 5/80 (2024.01); G06T 7/73 (2017.01)

(58) Field of Classification Search
None
See application file for complete search history.

(56) References Cited

U.S. PATENT DOCUMENTS

| 7,457,698 B2 * | 11/2008 | Danko | E02F 3/439 |
| | | | 700/262 |
| 12,000,114 B2 * | 6/2024 | Kanari | E02F 9/265 |
| 2020/0279397 A1 * | 9/2020 | Cheng | G06T 7/74 |

(Continued)

FOREIGN PATENT DOCUMENTS

| EP | 2833162 A1 | 2/2015 |
| EP | 3477247 A1 | 5/2019 |
| JP | 2017-053627 A | 3/2017 |

OTHER PUBLICATIONS

Extended European Search Report dated Feb. 7, 2024, issued in corresponding European Patent Application No. 23191296.5 (8 pgs.).

*Primary Examiner* — James M Mcpherson
(74) *Attorney, Agent, or Firm* — Pillsbury Winthrop Shaw Pittman, LLP

(57) ABSTRACT

A working machine includes: a working machine body; a first working unit (boom) having one end connected to the working machine body, and configured to be displaced relative to the working machine body; a second working unit (arm) connected to another end of the first working unit via a link; a third working unit (bucket) connected to the second working unit via a link; an image capturing unit provided on the working machine body, and configured to capture an image of one end of the second working unit that is located near the first working unit; and a position detecting unit configured to detect a position of another end of the second working unit that is located near the third working unit based on the image captured by the image capturing unit.

3 Claims, 5 Drawing Sheets

(56) References Cited

U.S. PATENT DOCUMENTS

| | | | |
|---|---|---|---|
| 2020/0347580 A1* | 11/2020 | Raszga | G06N 3/08 |
| 2021/0156121 A1* | 5/2021 | Hayakawa | G06T 7/70 |
| 2022/0010520 A1* | 1/2022 | Sano | E02F 9/2029 |
| 2022/0056669 A1* | 2/2022 | Tamasato | G01C 11/06 |
| 2022/0364336 A1* | 11/2022 | Ueta | E02F 9/265 |
| 2024/0026658 A1* | 1/2024 | Akiyama | E02F 9/264 |

* cited by examiner

WORKING MACHINE AND POSITION DETECTING DEVICE

CROSS-REFERENCE TO RELATED APPLICATIONS

This application is based on and claims the benefit of priority from Japanese Patent Application Serial No. 2022-162335 (filed on Oct. 7, 2022), the contents of which are hereby incorporated by reference in their entirety.

TECHNICAL FIELD

The present disclosure relates to a working machine and a position detecting device.

BACKGROUND

A conventionally known construction machine has a camera for capturing an image of a working machine in order to identify the orientation of the working machine. For example, a known working machine has a camera for capturing images of a plurality of links (see, for example, Japanese Patent Application Publication No. 2017-053627). Based on the images captured by the camera, the working machine can detect the relative angle between adjacent links. The camera captures images of a circling structure, which corresponds to the link at the end, and also captures images of a boom (a first working unit), an arm (a second working unit) and a bucket (a third working unit), which correspond to the other links.

The conventional art, however, may disadvantageously fail to accurately detect the position of the coupling between the second and third working units in a simple manner. This problem can be attributable to various factors. For example, when the coupling moves away from the circling structure, this may make it difficult to obtain specific image data of the coupling. In addition, the coupling may move out of the image capturing region.

SUMMARY

The present disclosure aims to provide a working machine and a position detecting device capable of accurately detecting the position of the coupling between the second and third working units in a simple manner.

(1) One aspect of the present disclosure provides a working machine including: a working machine body; a first working unit having one end connected to the working machine body, the first working unit being configured to be displaced relative to the working machine body; a second working unit connected to another end of the first working unit via a link; a third working unit connected to the second working unit via a link; an image capturing unit provided on the working machine body, the image capturing unit being configured to capture an image of one end of the second working unit that is located near the first working unit; and a position detecting unit configured to detect a position of another end of the second working unit that is located near the third working unit based on the image captured by the image capturing unit.

In the implementation, the working machine relating to the present disclosure can use the captured image of the one end of the second working unit, which is relatively close to the image capturing unit. If the third working unit moves away from the working machine body, the conventional working machine can only produce extremely coarse captured image data. The present disclosure, however, can prevent such a risk. The third working unit or part of the second working unit may get buried in the ground, or otherwise move out of the image capturing area. Even if such occurs, the working machine relating to the present disclosure can still capture an image of the above-mentioned end, which is part of the second working unit. Therefore, the working machine relating to the present disclosure can accurately detect the position of the other end of the second working unit.

(2) In the implementation, the working machine may include an angle estimating unit configured to estimate a first angle based on the image captured by the image capturing unit, the first angle representing an angle formed between the first and second working units. The position detecting unit may detect the position of the other end of the second working unit based on the first angle.

(3) In the implementation, the working machine may include an angle detecting unit configured to detect a second angle representing an angle formed between the working machine body and the first working unit. The position detecting unit may detect the position of the other end of the second working unit based on the first and second angles.

(4) In the implementation, the image capturing unit may include a lens configured to capture a wider angle than a standard lens. The working machine may include a transforming unit configured to perform projective transformation on the image captured through the lens. The angle estimating unit may estimate the first angle based on the captured image that has been subjected to the projective transformation performed by the transforming unit.

(5) In the implementation, the working machine body may have a cab. The image capturing unit may be provided inside the cab.

(6) Another aspect of the present disclosure provides a position detecting device for detecting a position of a working unit of a working machine body of a working machine. The working machine body includes a first working unit and a second working unit connected to each other via a link such that the first and second working units are configured to be displaced. The position detecting device includes: an image capturing unit configured to capture an image of an end of the second working unit that is located near the first working unit; and an angle estimating unit configured to estimate a first angle based on the image captured by the image capturing unit, the first angle representing an angle formed between the first and second working units.

In the implementation, the position detecting device can use the captured image of the one end of the second working unit, which is relatively close to the image capturing unit. This can reduce the risk of extremely coarse image data even when the third working unit moves away from the working machine body. The third working unit or part of the second working unit may get buried in the ground, or otherwise move out of the image capturing area. Even if such occurs, the position detecting device relating to the present disclosure can still capture an image of the above-mentioned end, which is part of the second working unit. As estimating the angle formed between the first and second working units, the position detecting device relating to the present disclosure can accurately detect the position of the other end of the second working unit.

(7) In the implementation, the image capturing unit may include a lens configured to capture a wider angle than a standard lens. The position detecting device may include: a correcting unit configured to correct for distortion of the image captured through the lens; and a transforming unit configured to perform projective transformation on the captured image that has been corrected for by the correcting unit.

The working machine and position detecting device relating to the present disclosure are capable of accurately detecting the position of the coupling between the second and third working units in a simple manner.

DESCRIPTION OF THE PREFERRED EMBODIMENTS

The embodiments of the present disclosure will be hereinafter described with reference to the drawings.
(Working Machine 110)

Figure 1:
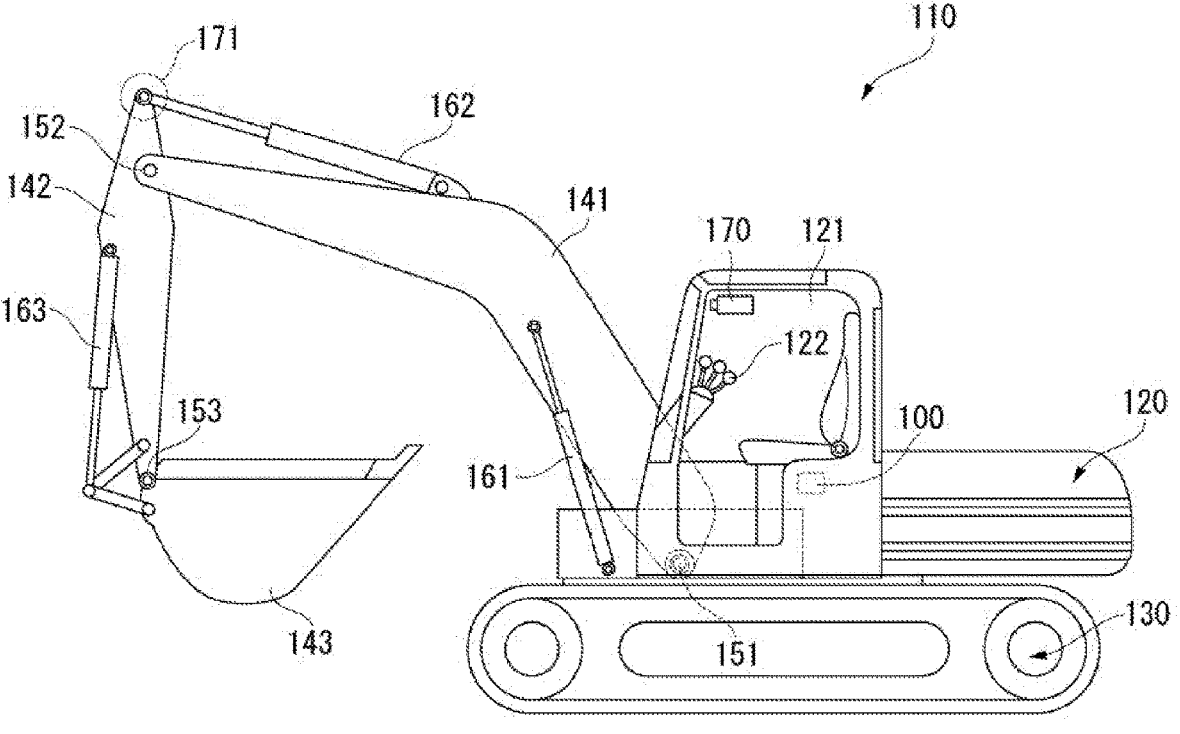
FIG. 1 illustrates a working machine 110 including a position detecting device 100 relating to an embodiment of the present disclosure.

FIG. 1 illustrates a working machine 110 including a position detecting device 100 relating to an embodiment of the present disclosure. In FIG. 1, the working machine 110 is, for example, a hydraulic excavator having a hydraulically operated actuator.

As shown in FIG. 1, the working machine 110 includes a circling structure 120, which is referred to as a working machine body, and a traveling structure 130. The circling structure 120 is provided on the traveling structure 130 and capable of circling. The circling structure 120 includes a cab 121 where an operator can be accommodated. The cab 121 has a manipulating unit 122 for receiving instructions to manipulate a plurality of working units. In response to instructions to manipulate received by the manipulating unit 122, a plurality of hydraulic valves are accordingly opened or closed. As the hydraulic valves are opened or closed, hydraulic oil, which originates from a hydraulic pump, is delivered to a plurality of hydraulic cylinders (i.e., a boom cylinder 161, an arm cylinder 162, a bucket cylinder 163). The hydraulic cylinders are configured to extend and retract according to the amount of the delivered hydraulic oil.

The working machine 110 includes a boom 141, an arm 142, and a bucket 143, which are respectively referred to as first, second and third working units. The working units are connected using links 151 to 153.

Specifically, the boom 141 is connected to the circling structure 120 via the first link 151, and configured to swing relative to the circling structure 120. The boom cylinder 161 is connected between the boom 141 and the circling structure 120. As the boom cylinder 161 extends or retracts in response to the manipulation via the manipulating unit 122, the boom 141 swings relative to the circling structure 120.

The arm 142 is connected to the boom 141 via the second link 152, and configured to swing relative to the boom 141. The arm cylinder 162 is connected between the arm 142 and the boom 141. As the arm cylinder 161 extends or retracts and swings in response to the manipulation via the manipulating unit 122, the arm 142 swings relative to the boom 141.

The bucket 143 is connected to the arm 142 via the third link 153, and configured to swing relative to the arm 142. The bucket cylinder 163 is connected between the bucket 143 and the arm 142. As the bucket cylinder 163 extends or retracts and swings in response to the manipulation via the manipulating unit 122, the bucket 143 swings relative to the arm 142.

The working machine 110 has an image capturing unit 170 in the cab 121. The image capturing unit 170 has a fisheye lens achieving wider angles of view than a standard lens. The image capturing unit 170 is fixedly positioned on the circling structure 120 and configured to continuously capture moving or still images. The image capturing unit 170 can be constituted using a CCD (charge coupled device) camera or a CMOS (Complementary Metal Oxide Semiconductor) camera. The image capturing unit 170 takes images centered around the protruding end 171 of the arm 142. One of the ends of the arm 142 that is located near the second link 152 is referred to as the protruding end 171. As located at the top portion of the working machine 110, the protruding end 171 is difficult to be contaminated and easy to be detected.

The image capturing area of the image capturing unit 170 is only required to include the protruding end 171, and does not need to consider the positions of the boom 141 and arm 142. In other words, the image capturing area need not include part of the boom 141, part of the arm 142 and part or all of the bucket 143. The image capturing unit 170 is not necessarily located in the cab 121 but may be located outside the cab 121.

The working machine 110 does not necessarily have a hydraulically operated actuator. For example, the working machine 110 may have an actuator that can be operated using water or air pressure. The working machine 110 may have an actuator that can be operated using more than one of three options, oil, water and air pressures.
<Hardware Configuration of Position Detecting Device 100>

Figure 2:
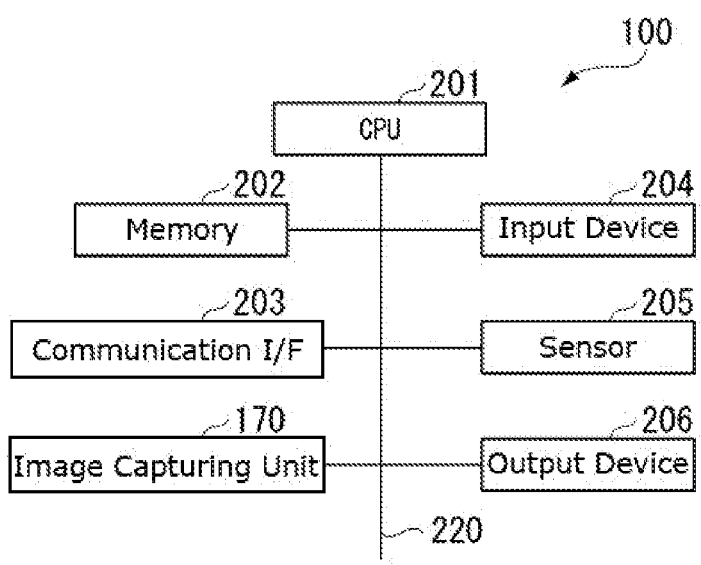
FIG. 2 shows, as an example, the hardware configuration of the position detecting device 100.

FIG. 2 shows, as an example, the hardware configuration of the position detecting device 100. As shown in FIG. 2, the position detecting device 100 has a CPU (Central Processing Unit) 201, a memory 202, a communication I/F (interface) 203, an input device 204, a sensor 205, an output device 206, and an image capturing unit 170. These components are connected to each other by a bus 220.

The CPU 201 controls all of the components of the position detecting device 100. The memory 202 includes, for example, a ROM, a RAM, a USB (Universal Serial Bus) flash memory, a SSD (Solid State Drive), and various other storage components. For example, the ROM stores various programs. The various programs include a position detecting program relating to the present embodiment. The position detecting program is configured to detect (estimates) the position of the third link 153 based on the image captured by the image capturing unit 170. The RAM is used as a work area by the CPU 201. The programs stored in the memory 202 are loaded into the CPU 201, so that the CPU 201 can execute the coded processes.

The communication I/F 203 is connected to a network such as the Internet via a communication line. In addition, the communication I/F 203 is connected to other devices (e.g., external servers, mobile terminals, etc.) via the network. In addition, the communication I/F 203 serves as the interface between the network and the internal parts of the device where it resides, and also controls the input/output of data from/to other devices.

The input device 204 includes the manipulating unit 122 for receiving instructions to manipulate the working machine 110 made by the operator. The input device 204 also includes a touch panel and operation buttons of the position detecting device 100. The image capturing unit 170 inputs into the position detecting device 100 the data of the captured image including the protruding end 171. The sensor 205 includes various types of sensors of the working machine 110. The sensor 205 includes, for example, an angle sensor (an example of an angle detecting unit) for detecting the angle of the boom 141 relative to the circling structure 120. The output device 206 includes, for example, a manipulation display and a speaker. For example, the output device 206 displays or outputs in sound the detected position of the third link 153, which is the result of executing the position detecting program by the CPU 201.

<Example Hardware Configuration of Position Detecting Device 100>

Figure 3:
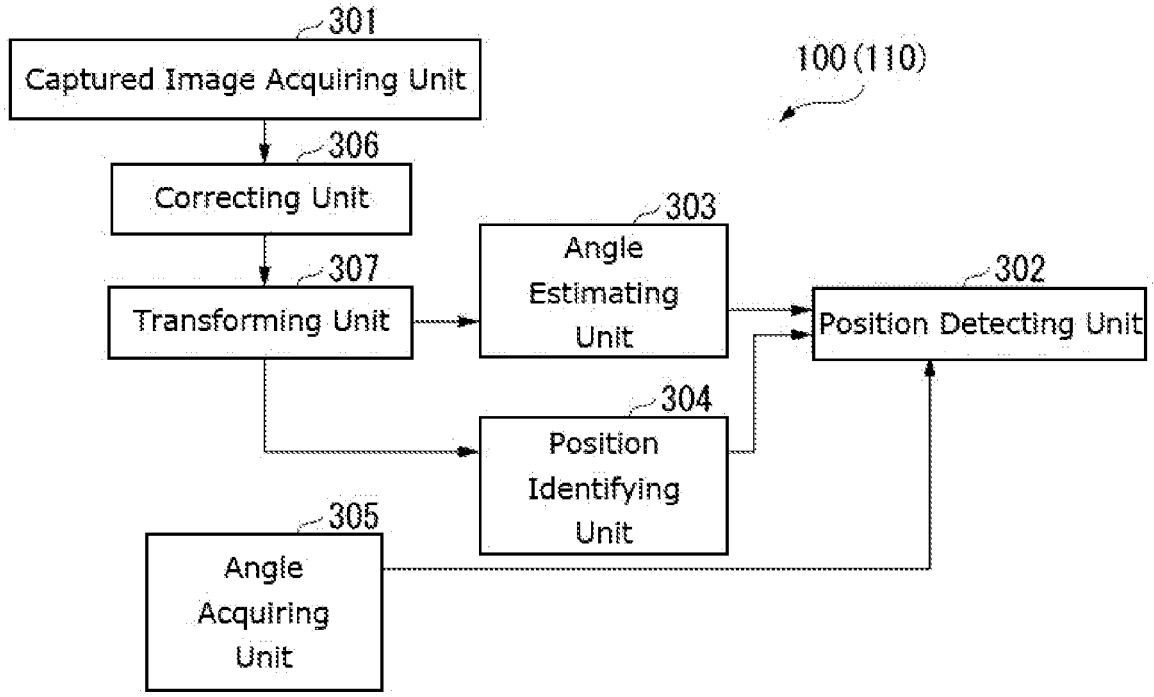
FIG. 3 shows, as an example, the hardware configuration of the position detecting device 100.

FIG. 3 shows, as an example, the hardware configuration of the position detecting device 100. As shown in FIG. 3, the position detecting device 100 includes a captured image acquiring unit 301, a position detecting unit 302, an angle estimating unit 303, a position identifying unit 304, an angle obtaining unit 305, a correcting unit 306 and a transforming unit 307. These functional units are implemented by the CPU 201. In other words, the functional units are implemented by the CPU 201 executing the position detecting program stored in the memory 202.

Figure 4:
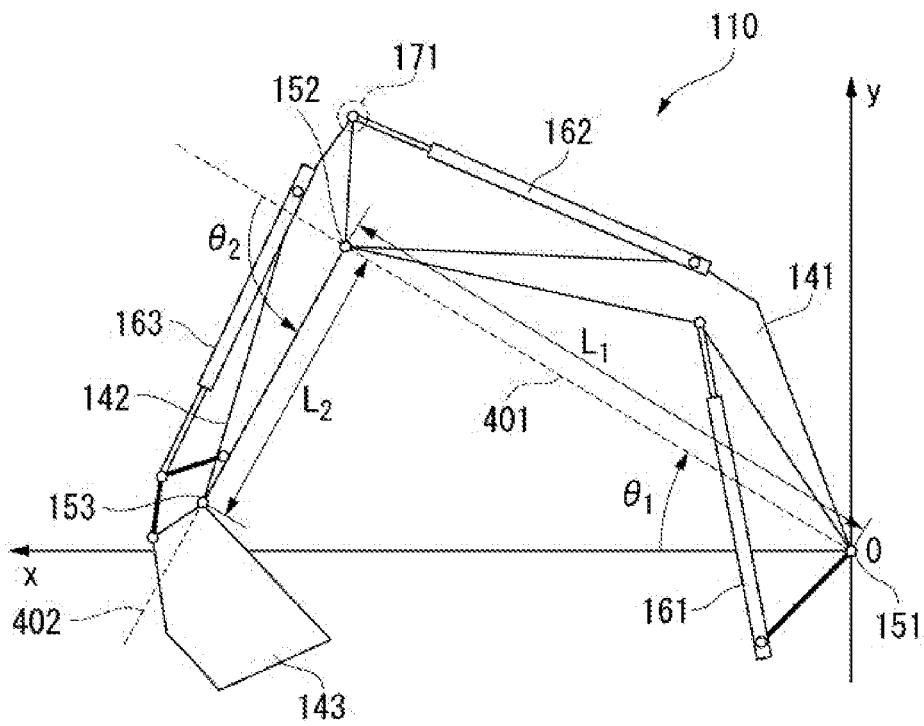
FIG. 4 illustrates, as an example, how to detect the position of a third link 153.

The captured image acquiring unit 301 acquires the image of the protruding end 171 captured by the image capturing unit 170 (captured image data). Based on the captured image of the protruding end 171, the position detecting unit 302 detects the position of one of the ends of the arm 142 that is connected to the bucket 143. The working machine 110 relating to the present embodiment is configured such that the position of the one end coincides with the position of the third link 153. Therefore, the position of the one end corresponds to the position of the third link 153. With reference to FIG. 4, the following describes an example of how to detect the position of the third link 153.

FIG. 4 illustrates, as an example, how to detect the position of the third link 153. In FIG. 4, the x axis represents the direction in which the working machine 110 travels (the traveling direction), and the y axis represents the vertical direction of the working machine 110. As shown in FIG. 4, the angle θ1 represents the angle between the traveling direction of the working machine body or the circling structure 120 (the x axis) and the boom 141 (hereinafter, referred to as "the boom angle"). Specifically, the boom angle θ1 can be expressed as the angle between the straight line 401 connecting the first and second links 151 and 152 and the x axis (i.e., the angle by which the boom 141 is raised). In the example shown, the boom angle θ1 is defined as the angle between the straight line 401 and the x axis, but the present embodiment is not limited to such. For example, the boom angle θ1 may be defined as the angle between the straight line 401 and the y-axis (i.e., the angle by which the boom 141 is lowered).

The angle θ2 refers to the angle of the arm 142 relative to the boom 141 (hereinafter referred to as "the arm angle"). As mentioned above, the boom angle θ1 represents the angle between the x-axis and the straight line 401. Accordingly, the arm angle θ2 can be expressed as the angle between the straight line 401 and the straight line 402 connecting the second and third links 152 and 153. In the example shown, the arm angle θ2 is defined as the angle by which the arm 142 is lowered relative to the straight line 401. The present embodiment, however, is not limited to such. For example, the arm angle θ2 may be defined as the angle by which the arm 142 is raised relative to the straight line 401.

The position of the third link 153 is detected based on the image of the protruding end 171 captured by the image capturing unit 170. The following now describes an example of how to detect the position of the third link 153. In the embodiment, the length L2 of the arm 142 and the positional relation between the protruding end 171 and the second link 152 are known in advance. Therefore, the position of the third link 153 can be detected through operations as long as the position of the protruding end 171 and the arm angle θ2 are identified. The length L2 of the arm 142 corresponds to the distance between the second link 152 and the third link 153 along the straight line 402.

Figure 5A:
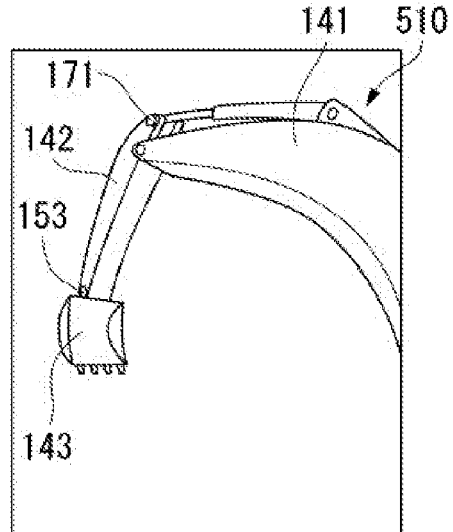
FIG. 5A shows an example of image data used to estimate an arm angle θ2 and identify the position of a protruding end 171.
Figure 5B:
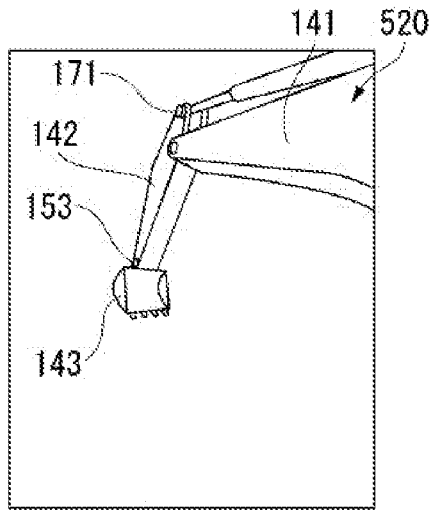
FIG. 5B shows an example of image data used to estimate the arm angle θ2 and identify the position of the protruding end 171.

The arm angle θ2 and the position of the protruding end 171 are calculated based on the captured image data acquired by the image capturing unit 170. With reference to FIGS. 5A, 5B and SC, the following specifically describes how to identify the arm angle θ2 and the position of the protruding end 171.

FIGS. 5A, SB and SC show an example of captured image data used to estimate the arm angle θ2 and to identify the position of the protruding end 171. FIG. 5A shows a captured image 510 captured by the image capturing unit 170. As captured using the fisheye lens, the captured image 510 contains distortion. As shown in the captured image 510, the boom 141 and arm 142 are curved due to the distortion. The correcting unit 306 therefore corrects for the distortion of the captured image 510. The correcting unit 306 corrects for the distortion by, for example, performing coordinate transformations and interpolation using distortion correction parameters.

FIG. 5B shows a corrected image 520 resulting from the correction performed by the correcting unit 306. The corrected image 520 has a predetermined horizontal angle of view without distortion. Therefore, the distortion of the boom 141 and arm 142 are no longer present in the corrected image 520. In the corrected image 520, the boom 141 and arm 142 appear straight, as in images captured using standard lenses.

The transforming unit 307 performs projective transformation on the corrected image 520 produced by the correcting unit 306. Specifically, the transforming unit 307 performs planar projective transformation on the corrected image 520 to produce a transformed image 530, which is viewed from an imaginary viewpoint located on the lateral side (the left side in the drawing) of the working machine 110.

Figure 5C:
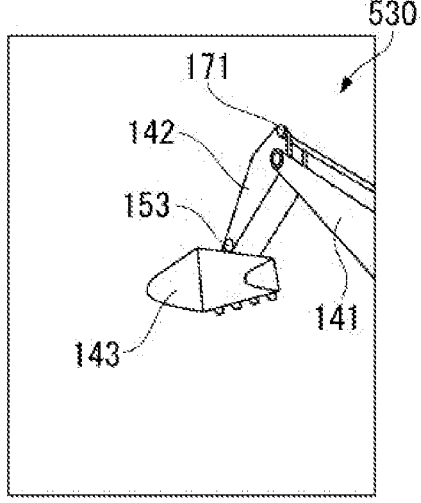
FIG. 5C shows an example of image data used to estimate the arm angle θ2 and identify the position of the protruding end 171.

FIG. 5C shows the transformed image 530 produced through the projective transformation performed by the transforming unit 307. The transformed image 530 is an image of the working machine 110 where the working machine 110 is seen from side. The transforming unit 307 performs projective transformation using a predetermined mapping table with the imaginary viewpoint being set at the lateral side of the working machine 110. The projective transformation combines the image segments of the corrected image 520 such that the overlapping regions are overlaid on each other. In this manner, the transforming unit 307 can produce the transformed image 530, which shows the working machine 110 from side.

The angle estimating unit 303 estimates the arm angle θ2 by performing image analysis on the transformed image 530. The position identifying unit 304 identifies the position (coordinates) of the protruding end 171 by performing image analysis on the transformed image 530. The positional relation between the protruding end 171 and the second link 152 is known in advance. Therefore, the position identifying unit 304 can identify the position of the second link 152 by performing operations based on the position of the protruding end 171 and the positional relation. The position detecting unit 302 detects the position (coordinates) of the third link 153 based on the position of the second link 152 identified by the position identifying unit 304, the known length L2, and the arm angle θ2.

<How to Obtain Boom Angle θ1>

The position of the second link 152 is not necessarily identified based on the position of the protruding end 171. For example, in attempts to make the detection of the position of the second link 152 as accurately as possible, the position of the second link 152 may be identified based on the boom angle θ1. In other words, provided that the boom angle θ1 can be known, the position (coordinates) of the second link 152 can be identified.

Specifically, the angle acquiring unit 305 acquires the boom angle 91 based on the results detected by the angle sensor included in the sensor 205. The position identifying unit 304 identifies the position of the second link 152 based on the boom angle θ1 acquired by the angle acquiring unit 305 and the known length L1. For example, the memory 202 or the like stores thereon "an angle-position table" where each value of the boom angle θ1 is associated with a specific position (coordinates) of the second link 152. The position identifying unit 304 may refer to the table to retrieve the position (coordinates) associated with the value of the boom angle θ1 acquired by the angle acquiring unit 305.

As identifying the position of the second link 152 based on the boom angle θ1, the position identifying unit 304 can identify the position of the second link 152 more accurately. Therefore, the position detecting unit 302 can more accurately detect the position of the third link 153.

The boom angle θ1 is not necessarily acquired based on the result detected by the angle sensor. For example, the boom angle θ1 can be alternatively acquired by performing image analysis on the image captured by the image capturing unit 170 (e.g., the transformed image 530). In other words, the angle acquiring unit 305 may acquire the boom angle θ1 based on the captured image.

<Position Detecting Procedure Performed by Position Detecting Device 100 Relating to the Embodiment>

Figure 6:
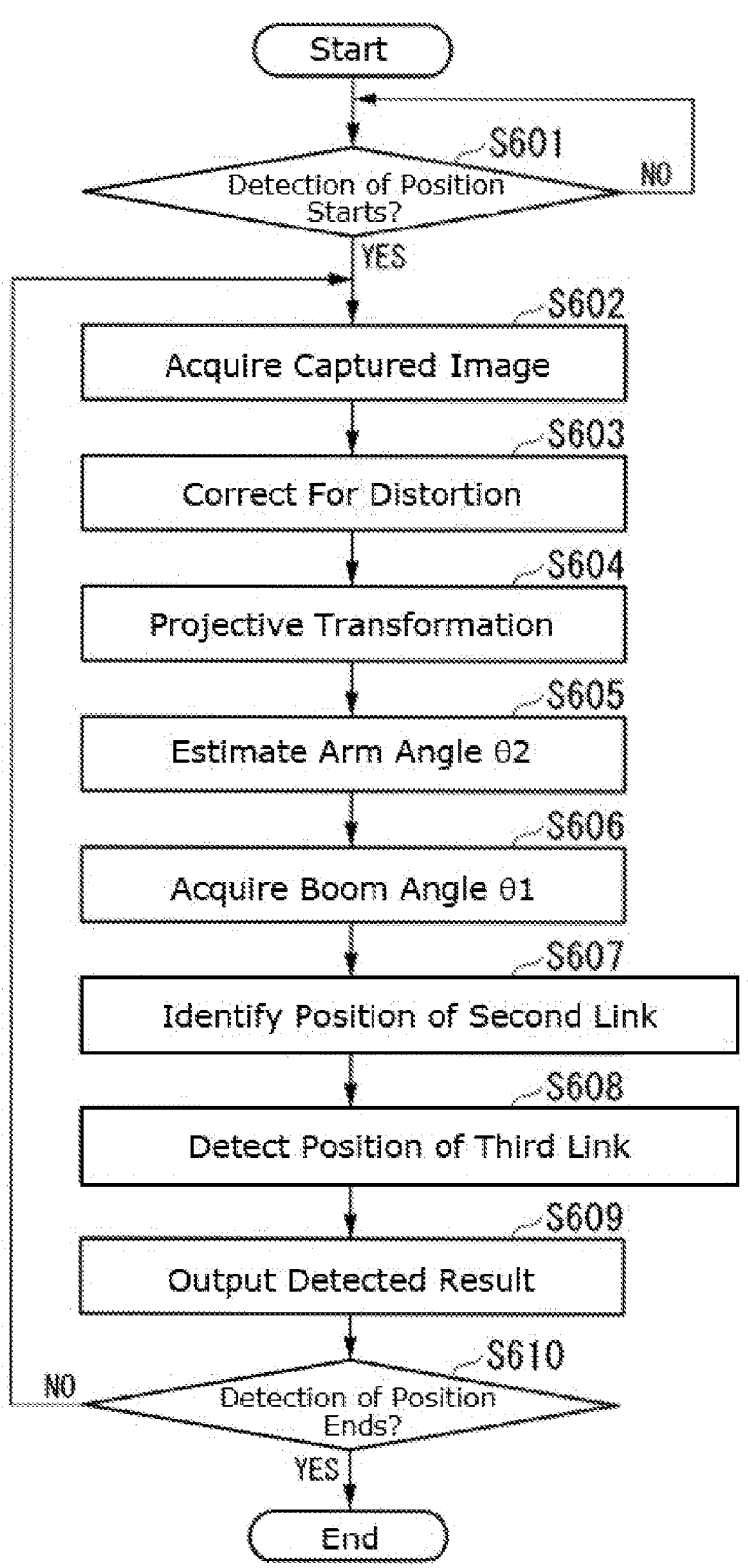
FIG. 6 is a flowchart showing an example of a position detecting procedure performed by the position detecting device 100 relating to the embodiment.

FIG. 6 is a flowchart showing an example of the position detecting procedure performed by the position detecting device 100 relating to the embodiment. As shown in FIG. 6, the position detecting device 100 determines whether to start to detect the position of the third link 153 (step S601). The detection of the position of the third link 153 may start when, for example, the working machine 110 or position detecting device 100 is turned on, or the position detecting function is turned on if the position detecting function is configured to be selected between the turned-on and turned-off states, or the working units including the boom 141, arm 142 and bucket 143 start working.

The position detecting device 100 waits until the detection of the position of the third link 153 starts (step S601: NO).

If the detection of the position of the third link 153 starts (step S601: YES), the position detecting device 100 (captured image acquiring unit 301) acquires the captured image 510 captured by the image capturing unit 170 (FIG. 5A) (step S602). The position detecting device 100 (correcting unit 306) corrects for the distortion of the captured image 510 (step S603) to obtain the corrected image 520 (FIG. 5B).

The position detecting device 100 (transforming unit 307) subsequently performs projective transformation on the corrected image 520 (step S604) to obtain the transformed image 530 (FIG. 5C). The position detecting device 100 (angle estimating unit 303) then performs image analysis on the transformed image 530 to estimate the arm angle θ2 (step S605). After this, the position detecting device 100 (angle acquiring unit 305) acquires the boom angle θ1 based on the result of the detection performed by the angle sensor included in the sensor 205 (step S606). The position detecting device 100 (position identifying unit 304) then identifies the position of the second link 152 based on the boom angle θ1 and the length L1 of the boom 141 (step S607).

Following this, the position detecting device 100 (position detecting unit 302) detects the position of the third link 153 based on the estimated arm angle θ2, the identified position of the second link 152, and the known length L2 (step S608).

The position detecting device 100 outputs the detected position of the third link 153 as the detected result (step S609). The detected result is shown as an image on a monitor. For example, the position detecting device 100 can identify the position and orientation of the bucket 143 based on an input signal entered via a manipulation lever or other devices, and show the identified position and orientation of the bucket 143 in the image of the detected result.

The position detecting device 100 subsequently determines whether the detection of the position of the third link 153 ends (step S610). The detection of the position of the third link 153 may end when, for example, the working machine 110 or position detecting device 100 is turned off, or the position detecting function is turned off if the position detecting function is configured to be selected between the turned-on and turned-off states, or the working units stop working.

If the detection of the position of the third link 153 does not end (step S610: NO), the position detecting device 100 goes back to the step S602 and performs the steps S602 to S610 again. If the detection of the position of the third link 153 ends (step S610: YES), the position detecting device 100 finishes performing the series of steps.

Advantageous Effects of Embodiments

As has been described above, the position detecting device 100 and working machine 110 relating to the present embodiment capture an image of the protruding end 171 of the arm 142 and detects the position of the third link 153 based on the captured image. The protruding end 171 is relatively closely positioned to the image capturing unit 170, and its image can be used. This can reduce the risk of extremely coarse image data even when the bucket 143 moves away from the circling structure 120. In addition, the bucket 143 or part of the arm 142 may get buried in the ground or otherwise they may move out of the image capturing area. Even if such occurs, the protruding end 171, which is part of the arm 142, can still be image-captured. Therefore, the position detecting device 100 and working machine 110 relating to the present embodiment can accurately detect the position of the third link 153. In other words, the present embodiment can accurately detect the position of the bucket 143 in a simple manner.

The position detecting device 100 and working machine 110 relating to the present embodiment estimates the arm angle θ2 based on the captured image of the protruding end 171, and detects the position of the third link 153 based on the estimated arm angle θ2. Therefore, the position detecting device 100 and working machine 110 relating to the present embodiment can accurately detect the position of the third link 153 simply by estimating the arm angle θ2 based on the captured image.

The position detecting device 100 and the working machine 110 relating to the present embodiment detects the position of the third link 153 based on the boom angle θ1, which is acquired by the angle acquiring unit 305, and the arm angle θ2, which is estimated by the angle estimating unit 303. Therefore, the position of the second link 152 can be accurately detected, so that the position of the third link 153 can be more accurately detected.

The position detecting device 100 and working machine 110 relating to the present embodiment performs projective transformation on the image captured using a fisheye lens and estimates the arm angle θ2 based on the image resulting from the projective transformation. In this manner, the arm angle θ2 can be estimated with improved accuracy. Therefore, the position of the third link 153 can be more accurately detected.

The position detecting device 100 and working machine 110 relating to the present embodiment corrects for the distortion of the image captured using a fisheye lens and performs projective transformation on the corrected captured image. In this manner, the arm angle θ2 can be estimated with improved accuracy. Therefore, the position of the third link 153 can be more accurately detected.

The position detecting device 100 and working machine 110 relating to the present embodiment has the image capturing unit 170 in the cab 121 provided in the circling structure 120, which is the working machine body. This can save the lens from being compromised by rainwater in case of rain. Irrespective of the surrounding environment, the position detecting device 100 and the working machine 110 relating to the present embodiment can acquire suitable captured image data. Therefore, the position of the third link 153 can be accurately detected. The image capturing unit 170 may be located outside the cab 121.

Other Embodiments

In the above-described embodiment, the position of the third link 153 may be detected based on the position of the protruding end 171 and the arm angle θ2. The position of the third link 153, however, can be detected without referring to the arm angle θ2. Specifically, for example, the shape of the arm 142 is known in advance. Using the known information, the position detecting unit 302 performs image analysis on the captured image of the protruding end 171. In this manner, the position detecting device 100 can identify the position of the protruding end 171 and the orientation (gradient) of the arm 142. The position detecting unit 302 can further detect the position of the third link 153 by performing operations based on the identified position and orientation. In this alternative manner, the position detecting unit 302 can still detect the position of the third link 153 based on the image captured by the image capturing unit 170.

In the working machine 110 relating to the embodiment described above, the position of the end of the arm 142 that is close to the bucket 143 coincides with the position of the third link 153. The position of this end of the arm 142, however, may not necessarily coincide with the position of the third link 153 when, for example, the bucket 143 is connected to a portion of the arm 142 that is closer to the middle (to the boom 141). In this case, the positional relation between the end of the arm 142 and the third link 153 is known in advance. In this manner, the position detecting unit 302 can detect the position of the end, and detect the third link 153 by performing operations based on the detected position of the end and the known positional relation.

The program for realizing the position detecting device 100 described above may be stored on a computer-readable storage medium, and the program may be loaded to a computer system to execute the program. The term "computer system" as used herein includes hardware such as an OS and peripheral devices. The term "computer-readable storage medium" refers to a storage device such as a portable medium including a flexible disc, a magneto-optical disc, a ROM, and a CD-ROM, and a hard disk built-in to the computer system. Further, the term "computer-readable storage medium" includes storage that retain the program for some period of time, like a volatile memory (for example, RAM) in a computer system that operates as a server or a client receiving the program through a network such as the Internet or a communication line such as a telephone line. The computer program mentioned above may be transmitted from a computer system that includes a storage device or the like storing the program to another computer system through a transmission medium or by a transmission wave in a transmission medium. The term "transmission medium" for transmitting the program refers to a medium that operates to transmit information, like a network (communication network) such as the Internet or a communication line (communication wire) such as the telephone line. Only a part of the functions described above may be implemented in the above program. Further, the functions described above may be implemented by a combination of the above program and other programs previously stored on the computer system. That is, the above program may be what is called a difference file (a difference program).

The foregoing is the description of the embodiments of the present disclosure with reference to the drawings. Specific configurations are not limited to the above embodiments but include design modifications within the purport of the present disclosure.

According to the foregoing embodiments and modification examples disclosed herein, a plurality of functions are distributively provided. Some or all of the functions may be integrated. Any one of the functions may be partly or entirely segmented into a plurality of functions, which are distributively provided. Irrespective of whether or not the functions are integrated or distributed, they are acceptable as long as they are configured to solve the problems.

What is claimed is:

1. A working machine comprising:
   a working machine body;
   a first working unit having one end connected to the working machine body via a first link, the first working unit being configured to be displaced relative to the working machine body;
   a second working unit connected to another end of the first working unit via a second link;
   a third working unit connected to the second working unit via a third link;
   an image capturing unit provided on the working machine body, the image capturing unit includes a lens and a camera, and being configured to capture an image centered around a protruding end of the second working unit that is located near the first working unit; and a position detecting unit configured to detect a position of one end of the second working unit that is located near the third working unit based on the image captured by the image capturing unit, wherein the working machine further comprises, a transforming unit configured to perform projective transformation on the image captured through the lens to produce a transformed image, an angle estimating unit configured to estimate a first angle represents an angle formed between the first and second working units by performing image analysis to the transformed image, and a position identifying unit configured (i) to identify a position of the protruding end by performing image analysis to the transformed image, and (ii) to identify a position of the second link from the position of the protruding end based on a positional relationship between the protruding end and the second link, wherein the position detecting unit detects the position of the one end of the second working unit based on the identified position of the second link, a known length of the second working unit, and the estimated first angle.

2. The working machine of claim 1, comprising an angle detecting unit configured to detect a second angle representing an angle formed between the working machine body and the first working unit, wherein the position detecting unit detects the position of the one end of the second working unit based on the first and second angles.

3. The working machine of claim 1, wherein the working machine body has a cab, and wherein the image capturing unit is provided inside the cab.

\* \* \* \* \*